(12) United States Patent
Stanley (10) Patent No.: US 6,426,883 B1
(45) Date of Patent: Jul. 30, 2002

(54) APPARATUS AND METHOD FOR SOFT SWITCHING OF PARALLEL SWITCH ASSEMBLIES

(75) Inventor: Gerald R. Stanley, Osceola, IN (US)

(73) Assignee: Harman International Industries, Incorporated, Northridge, CA (US)

(*) Notice: Subject to any disclaimer, the term of this patent is extended or adjusted under 35 U.S.C. 154(b) by 0 days.

(21) Appl. No.: 09/654,451

(22) Filed: Sep. 1, 2000

Related U.S. Application Data
(60) Provisional application No. 60/152,896, filed on Sep. 8, 1999.

(51) Int. Cl.[7] ............................................. H02M 3/335
(52) U.S. Cl. ......................................... 363/16; 363/124
(58) Field of Search ............................. 363/17, 16, 39, 363/97, 98, 132, 134, 124

(56) References Cited

U.S. PATENT DOCUMENTS

| | | | |
|---|---|---|---|
| 5,287,261 A | * 2/1994 | Ehsani | ........................ 363/124 |
| 5,307,004 A | 4/1994 | Carsten | |
| 5,325,283 A | 6/1994 | Farrington et al. | |
| 5,399,908 A | 3/1995 | Donaldson | |
| 5,515,002 A | 5/1996 | Ideler | |
| 5,673,188 A | * 9/1997 | Lusher et al. | ................ 363/132 |
| 5,856,919 A | 1/1999 | Moriarty, Jr. | |
| 5,875,103 A | * 2/1999 | Bhagwat et al. | ................ 363/17 |
| 5,959,438 A | * 9/1999 | Jovanovic et al. | ........... 323/222 |
| 6,016,258 A | * 1/2000 | Jain et al. | ....................... 363/17 |

FOREIGN PATENT DOCUMENTS

| | | |
|---|---|---|
| EP | 0798846 A | 10/1997 |
| JP | 07046853 | 2/1995 |

* cited by examiner

Primary Examiner—Adolf Deneke Berhane (57) ABSTRACT

An apparatus and method for reducing power loss due to switching of a switch mode power converter includes a power converter having a plurality of switch assemblies, each connected in parallel through an inductor to a common output node and a diode connected to a second common output node, and a switch controller for activating and deactivating the plurality of switch assemblies during successive switching cycles. The controller activates and deactivates each switch assembly one time during each switching cycle and activates one subset of switch assemblies before activating the remaining switch assemblies. The switch controller provides enable signals to commute the subset of switch assemblies among the plurality of switch assemblies to be activated before the remaining switch assemblies. The switch controller includes a modulator for modulating a clock signal and demand signal, and at least one delay circuit for providing a signal which is delayed in time relative to the modulated signal. The switch controller further includes a logic circuit for receiving the modulated signal and delayed signal to generate the commuted enable signals.

32 Claims, 10 Drawing Sheets

APPARATUS AND METHOD FOR SOFT SWITCHING OF PARALLEL SWITCH ASSEMBLIES

This application claims benefit of Ser. No. 60/152,876 filed on Sep. 8, 1999.

FIELD OF THE INVENTION

The present invention relates to an apparatus and method for providing soft switching of parallel switch assemblies, and more particularly to soft switching of parallel switch assemblies of a switch mode power converter.

BACKGROUND OF THE INVENTION

Conventional switch mode power converters employ controllable switch assemblies which each include a switch to alternately connect an inductor between the input and the output of the converter. Diodes are included in the switch assembly to provide isolation between the converter power input and output when the switch is closed.

As is well known in the art, the switches of such switch mode power converters lose substantial amounts of power during switching events. Regardless of the application of these power converters, for example, a motor speed control, a gradient amplifier, or a power supply, high power may exist across the switch terminals at the time the switch is activated and shortly thereafter. The diodes in the circuit typically will not cease conducting immediately when the switch is activated, but will allow reverse current to flow temporarily before "recovering" the ability to block reverse current and maintain reverse voltage.

The difficulty of constructing and implementing power converter switches increases as the current demands on the switches increase. Very large semiconductors, for example, often have low initial yields, generate significant heat and require special thermal mounting, and are difficult to electrically connect to other components in the circuit. Thus, most high current switches are made from parallel assemblies of smaller switches which are easier to construct. One tradeoff associated with the use of parallel switch assemblies, however, is the need to ensure accurate current sharing among the switches. Clearly, depending upon the electrical characteristics of each switch, there could be situations where one switch turns on before the other switches connected in parallel, or turns off, after the other switches. If one or more switches continues to operate at times different from the remaining switches, that switch may experience greater power dissipation and, over time, may fail.

Some conventional switch mode power converters employ an auxiliary power switch to achieve the enhanced efficiency of zero voltage switching ("ZVS") wherein the auxiliary switch is operated first to permit the voltage across the main switch to drop to zero before the switch is turned on. The auxiliary switch is typically coupled through a small inductor to the main switch circuit at the junction between the main switch and the anode of the switch assembly diode. Since the diode would generally be conducting such that it must be "reverse recovered" before the main switch can approach zero volts, the small inductance of the auxiliary switch can recover, rather than dissipate, the energy of the stored charge of the diode and the main switch circuit. Such auxiliary switches are generally configured to return the recovered energy to the main switch circuit after the ZVS event. However, additional switches result in additional expense which may prohibit the use of auxiliary switches in certain applications.

SUMMARY OF THE INVENTION

The present invention provides an apparatus and method for soft switching of parallel switch assemblies in a switch mode power converter including a plurality of switch assemblies joined by small inductances to a common node and individually controlled by a switch controller. The inductances function as resonant auxiliary switch inductors as well as traditional fast current sharing impedances. The switch controller enables a subset of switch assemblies (typically, one) during each switching cycle before enabling the remaining switch assemblies. The first enabled switch assembly hard recovers the energy stored in its diode, and soft recovers the diodes of the remaining switch assemblies. Additionally, the switch controller may disable a second subset of switch assemblies (typically, one) after the remaining switch assemblies have been disabled during each switching cycle. This zero current turn-off ("ZCT") technique ensures that most of the turn-off power loss occurs at the switch assembly which is disabled last. Moreover, the switch controller commutes the switch assemblies selected for the first and second subsets for each switching cycle.

The switch controller includes a clock circuit which provides a clock signal to a pulse width modulator. The pulse width modulator also receives a demand signal, such as the current demand of the power converter load, and outputs a modulated version of the demand signal. By passing the modulated signal through one or more delay circuits, and logically relating the delay signal(s) to the clock signal and/or the modulated signal, the switch controller provides enable inputs to the switches of each of the switch assemblies in a sequence that commutes the selection of the early enabled and late disabled switch assemblies. By selecting a different switch to be the first enabled and last disabled each switching cycle, the switch controller more evenly distributes the power losses and the attendant stresses across all of the switch assemblies included in the power converter.

BRIEF DESCRIPTION OF THE DRAWINGS

These and other features of the invention will become more apparent and the invention will be better understood upon reference to the following description of the invention in conjunction with the accompanying drawings wherein.

DETAILED DESCRIPTION OF EMBODIMENTS OF THE INVENTION

The embodiments of the invention described herein are not intended to be exhaustive or to limit the invention to the precise forms disclosed. Rather, the embodiments selected for description have been chosen to enable one skilled in the art to practice the invention.

Figure 1:
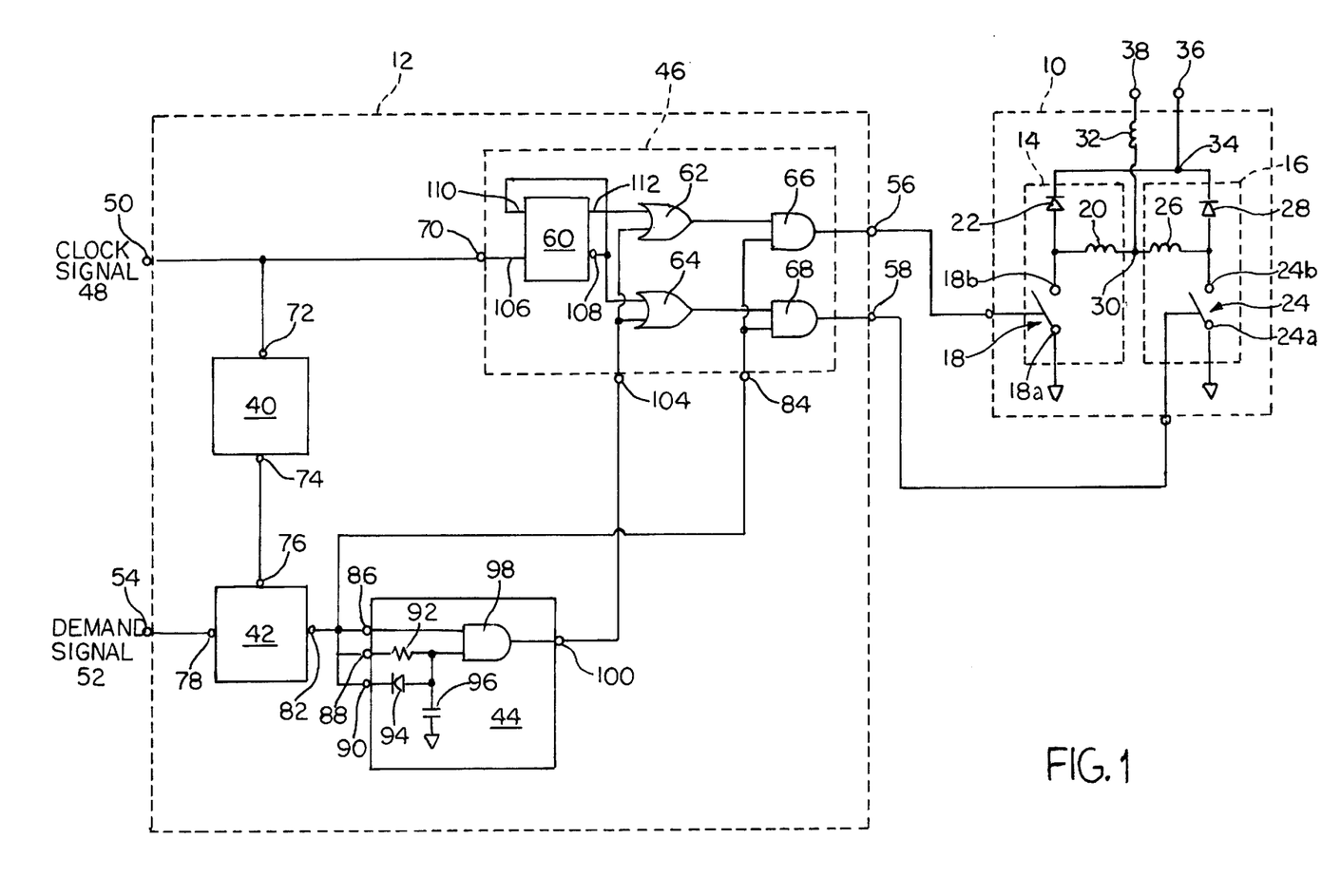
FIG. 1 is a schematic diagram of one embodiment of an apparatus for soft switching of parallel switch assemblies in a switch mode power converter.

FIG. 1 shows a two-switch parallel power switching assembly 10 connected to a switch controller 12. Assembly 10 includes switch assemblies 14, 16, and is used as a portion of a larger power converter. Switch assembly 14 includes a switch 18, typically a MOSFET or IGBT switch, an inductor 20, and a diode 22. Similarly, switch assembly 16 includes a switch 24, an inductor 26, and a diode 28. Nodes 18a and 24a of switches 18 and 24, respectively, are connected to a common node such as ground. Node 18b of switch 18 is connected to the anode of diode 22 and one side of inductor 20. Node 24b of switch 24 is similarly connected to diode 28 and inductor 26. The other sides of inductors 20 and 26 are connected to common node 30, which is connected to an inductor 32. Inductor 32 may be either a part of a filter circuit or a portion of the load driven by power switching assembly 10, such as a gradient coil or a winding of a motor. Inductor 32 is also connected to terminal 38. The cathodes of diodes 22, 28 are connected to another common node 34, which is connected to terminal 36. In a buck-derived power converter, terminal 36 receives incoming power and terminal 38 outputs power at a reduced voltage and increased current. In a boost-derived power converter, power is received on terminal 38 and outputted at an increased voltage and reduced current on terminal 36.

Switch controller 12 includes a triangle generator 40, a modulator 42, a delay generator 44, and a logic circuit 46. A clock signal 48, such as a square wave, is provided at input 50 of switch controller 12. A demand signal 52, for example, an input from an error control amplifier, or feedback signal from the controlled system, is provided at input 54 of switch controller 12. Outputs 56, 58 of switch controller 12 are connected to and control the operation of switches 18 and 24, respectively.

Logic circuit 46 includes a flip-flip 60, OR gates 62, 64, and AND gates 66, 68. Input 50 of switch controller 12 is connected to input 70 of logic circuit 46 and input 72 of triangle generator 40. Output 74 of triangle generator 40 is connected to input 76 of modulator 42. Input 78 of modulator 42 receives demand signal 52 from input 54 of switch controller 12. Modulator 42 outputs a modulated signal 80 on output 82. Output 82 is connected to delay generator 44 at inputs 86, 88, 90 and input 84 of logic circuit 46. Delay generator 44 includes a resistor 92, a diode 94, a capacitor 96, and an AND gate 98. One input of AND gate 98 is connected to delay generator input 86. The other input is connected to the anode of diode 94, one side of resistor 92, and one side of capacitor 96. The other side of resistor 92 is connected to delay generator input 88. The cathode of diode 94 is connected to delay generator input 90. The other side of capacitor 96 is connected to ground. The output of AND gate 98 is connected to output 100 of delay generator 44. Output 100 carries a delay signal 102 to input 104 of logic circuit 46.

Input 70 of logic circuit 46 is connected to input 106 of flip-flop 60. Flip-flop output 108 is connected to "D" input 110 and to one input of OR gate 64. Flip-flop output 112 is connected to one input of OR gate 62. Input 104 from delay generator 44 is connected to the other input of OR gates 62, 64. The outputs of OR gates 62, 64 are connected to one of the inputs of AND gates 66, 68, respectively. The modulated signal 80 received at logic circuit input 84 is routed to the other inputs of AND gates 66, 68.

Figure 2:
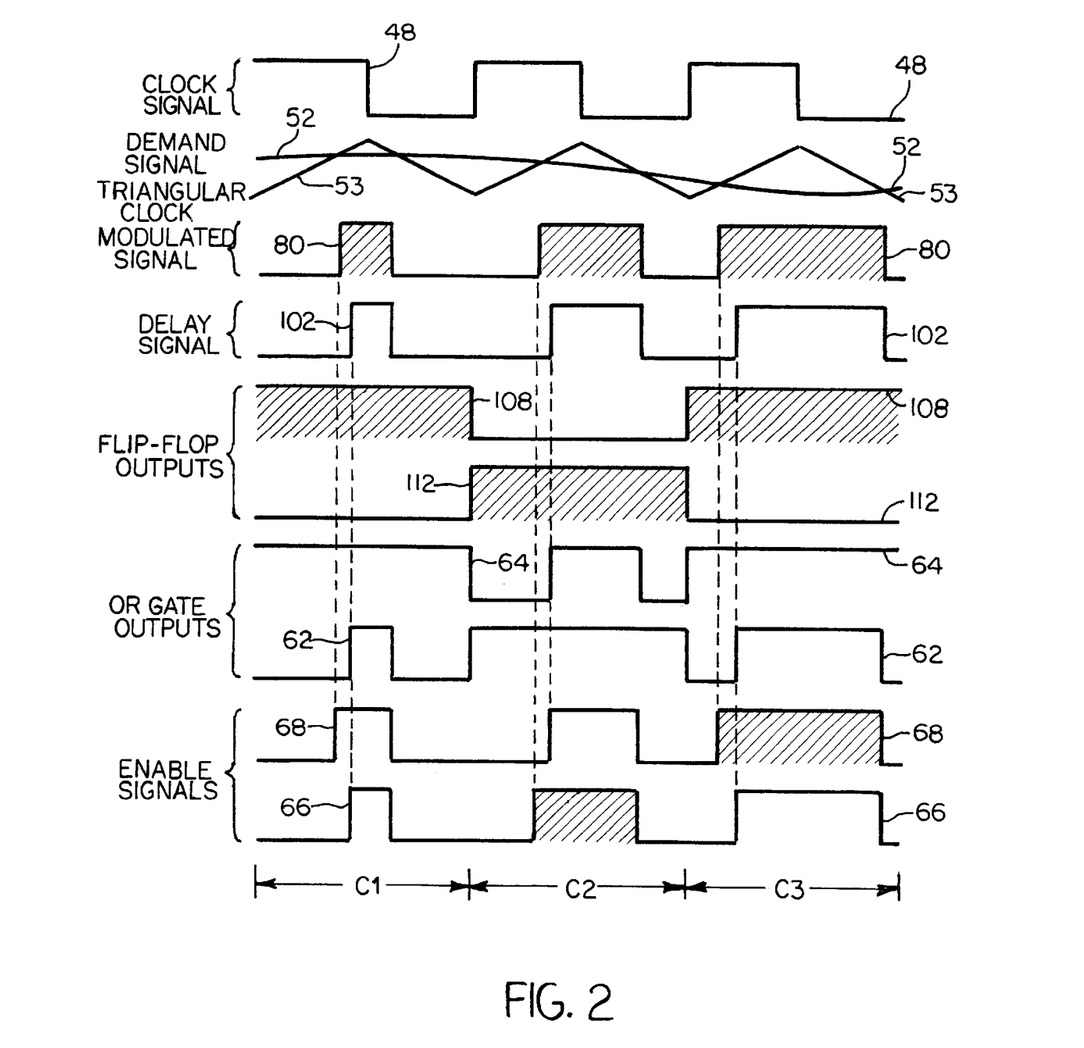
FIG. 2 is a waveform diagram depicting signals at various locations of the schematic of FIG. 1.

Referring now to FIG. 2, square wave clock signal 48 drives triangle generator 40 which outputs triangular clock signal 53, shown along with demand signal 52. As should be understood by one of ordinary skill in the art, non-square clocks may also be used to form saw tooth modulation waveforms such as triangular clock signal 53. Modulator 42 outputs modulated signal 80 which includes a series of pulses. Each pulse has a duration corresponding to a time period wherein triangular clock signal 53 is positive relative to demand signal 52. Delay generator 44 produces a delay only on the leading edge of each pulse of delayed signal 102. The trailing edge of each pulse of delay signal 102 occurs substantially simultaneously with the trailing edge of the corresponding pulse of modulated signal 80. The delay on the leading edge of delay signal 102 is proportional to the time constant formed by resistor 92 and capacitor 96 of delay generator 44. Diode 94 permits quick discharge of capacitor 96 when modulated signal 80 goes low. The components should be selected such that if a modulated signal 80 pulse duration is shorter than the delay generator 44 delay, then delay signal 102 will remain low during that particular switching cycle C1, C2, C3.

Clock signal 48 also results in flip-flop output 108, which transitions on the rising edge of clock signal 48. The inverse of output 108 appears at output 112 of flip-flop 60. The output of OR gate 64 is a logic high whenever either delay signal 102 or flip-flop output 108 is a logic high. Similarly, the output of OR gate 62 is a logic high whenever either delay signal 102 or flip-flop output 112 is a logic high. Since both output 62 and modulated signal 80 must be a logic high for AND gate 66 to output an enable signal 66 on switch controller output 56, the pulses of the enable signal 66 alternate with each switching cycle C1, C2, C3 between replicating a pulse of modulated signal 80 and a pulse of delay signal 102. Conversely, enable signal 68 from AND gate 68 alternates between replicating pulses of delay signal 102 and modulated signal 80. As can be seen by comparing enable signals 68, 66 of FIG. 2, during every other switching cycle C1, C2, C3, the leading edge of one of the waveforms is delayed in time relative to the leading edge of the other waveform. The trailing edge of both enable signals 68, 66 occur at substantially the same time.

The delay between the leading edges of enable signals 68, 66 is set to allow ZVS to form at the highest usable current of power switching assembly 10. The greater the current to be provided by assembly 10, the longer the delay generator 44 delay must be to achieve ZVS to recover the charges in diodes 22, 28.

As should be readily apparent to one of ordinary skill in the art, the components included in logic circuit 46 constitute one of many possible implementations to logically convert the input signals 48, 52 to enable signals 68, 66. Clearly, negative logic could readily be implemented, and any of various logic implementations could be implemented in, for example, a programmable logic device.

Theoretically, the two-switch power switching assembly 10, when operated in the manner described above, can result in one-half the turn-on losses that would otherwise be experienced without implementing a ZVS method. As a practical matter, however, the power loss associated with the added current burden on the switch assembly 18 or 24 used as an auxiliary switch will preclude a 50% reduction in power loss. Nonetheless, a reduction of power loss approaching the limit of $1/n$ of the power losses associated with standard non-ZVS methods (where n is the number of switch assemblies) should be realized. In high frequency power converter applications, where turn-on loss is a major percentage of the total power loss, a reduction in total power loss of greater than 50% may be realized. It should be understood that a practical limit exists on the number of switch assemblies (n) used in this design. For each switch assembly added to the converter, a reduction in power loss should occur. However, an increase in total current to be recovered by the selected switch will also occur. Accordingly, for larger assemblies, multiple parallel power switching assemblies 10 may be employed, each under the control of a switch controller 12 according to the procedure outlined above. In the case of multiple parallel power switching assemblies 10, the limit for reduction of turn-on power loss is $m/n$ (where m is the number of parallel power switching assemblies 10 used).

As should be apparent from the foregoing, the principles of the present invention may be employed to enable a subset of the total number of switch assemblies 14, 16 where more than two switch assemblies make up a parallel power switching assembly 10. For example, if four switch assemblies were employed in a single parallel power switching assembly 10, enable signal 66 could be connected to two switch assemblies, and enable signal 68 could be connected to the two remaining switch assemblies. As such, during each switching cycle, a subset of the total number of switch assemblies would be enabled before the remaining switch assemblies are enabled. In any event, however, logic circuit 46 should be implemented to ensure that no switch assembly selected as part of the subset of switch assemblies during one switching cycle is also selected as part of the subset of switch assemblies of the next switching cycle. In other words, the subsets of switch assemblies should be commuted in the same manner as the individual switch assemblies are commuted according to the principles outlined above.

Figure 3:
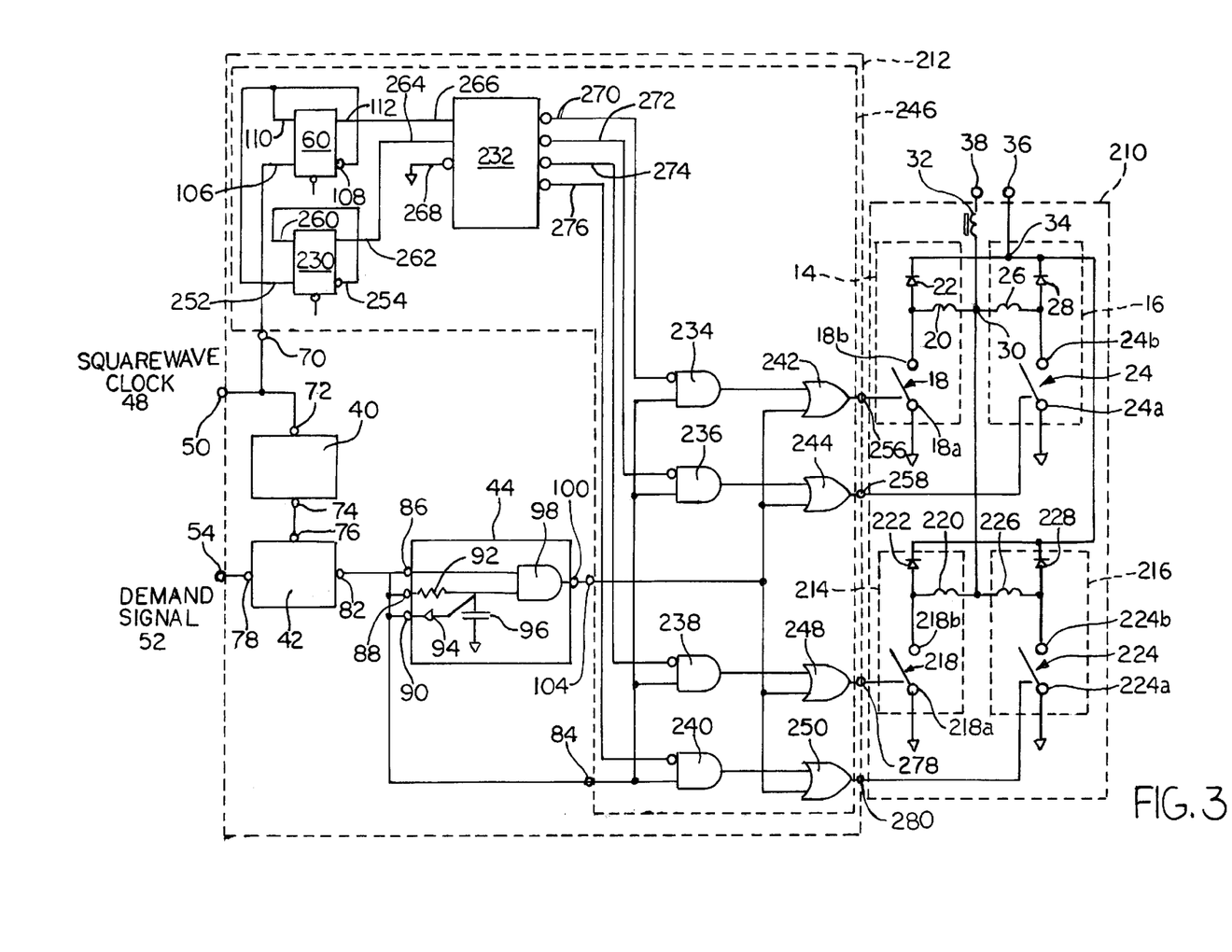
FIG. 3 is a schematic diagram of another embodiment of an apparatus according to the present invention.
Figure 4:
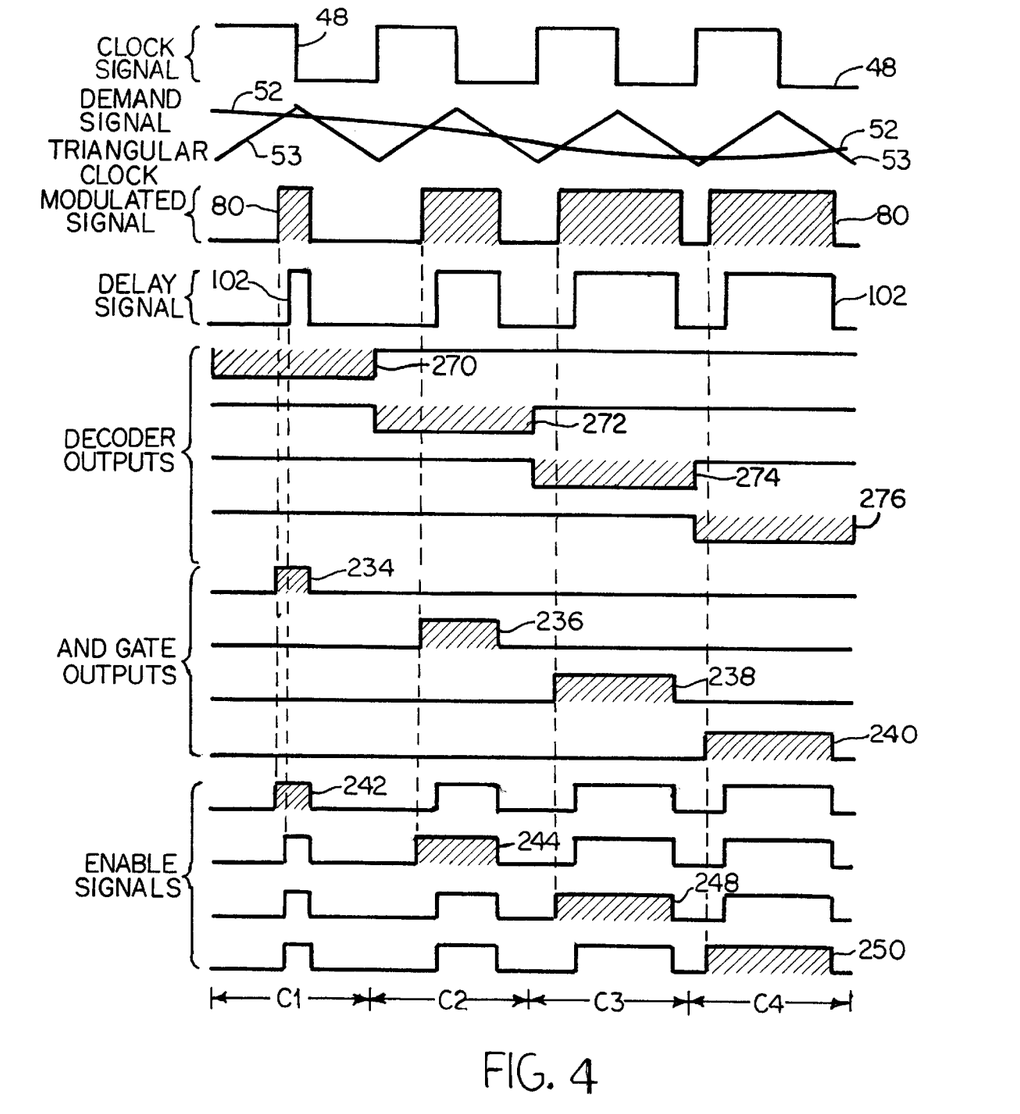
FIG. 4 is a waveform diagram similar to FIG. 2 of the embodiment of FIG. 3.

FIGS. 3 and 4 show an extension of the present invention to a power converter having four switch assemblies. The components and waveforms in common with those of FIGS. 1 and 2 retain their original reference designations. Referring to FIG. 3, a parallel power switching assembly 210 includes four switch assemblies 14, 16, 214, 216. Switch assemblies 14 and 16 are identical to those described in conjunction with the description of FIG. 1. Switch assemblies 214 and 216 are the same as switch assemblies 14 and 16, and use the same reference designations, increased by 200. Inductors 220 and 226 are connected to common node 30. Diodes 222 and 228 are connected to common node 34, thereby completing the parallel configuration of switch assemblies 14, 16, 214, 216.

Switch controller 212 includes triangle generator 40, modulator 42, delay generator 44, and modified logic circuit 246. Logic circuit 246 includes a first flip-flop 60 (identical to flip-flop 60 of FIG. 1), a second flip-flop 230, a decoder 232, AND gates 234, 236, 238, 240 and OR gates 242, 244, 248, 250. Output 108 of flip-flop 60 is connected to input 252 of flip-flop 230. Inverting output 254 of flip-flop 230 is connected to input 260, and output 262 is connected to input 264 of decoder 232. Similarly, output 112 of flip-flop 60 is connected to decoder input 266. Decoder input 268 is connected to ground. Decoder outputs 270, 272, 274, 276 are connected to the inverting input of AND gates 234, 236, 238, 240, respectively. The other input of each AND gate 234, 236, 238, 240 is connected to logic circuit input 84, which receives modulated signal 80.

The outputs of AND gates 234, 236, 238, 240 are connected to an input of OR gates 242, 244, 248, 250, respectively. The other input of each OR gate 242, 244, 248, 250 is connected to logic circuit input 104, which receives delay signal 102. The output of OR gate 242 is connected to logic circuit output 256 and controls switch 18. similarly, the outputs of OR gates 244, 248, 250 are connected to logic circuit outputs 258, 278, 280, respectively, and control switches 24, 218, 224, respectively.

It should be noted that AND gates 234, 236, 238, 240 and OR gates 242, 244, 248, 250 of FIG. 3 perform the same signal processing functions as gates 62, 64, 66, 68 of FIG. 1. The gating configuration of FIG. 3 simply illustrates another of many possible logical implementations according to the present invention. Additionally, the logic gates of FIG. 3 could readily be replaced with conventional logic arrays of a programmable logic device.

Referring now to FIG. 4, four switching cycles are shown, C1, C2, C3, and C4. As was the case with the embodiment of FIGS. 1 and 2, triangle generator 40 outputs triangular clock signal 53 as a function of clock signal 48. Modulated signal 80 is output by modulator 42 as a logic high signal whenever triangular clock signal 53 is positive relative to demand signal 52. Modulated signal 80 is passed through delay generator 44 to result in delay signal 102. As is shown in the figure, the leading edge of delay signal 102 is delayed in time relative to the leading edge of modulated signal 80.

Clock signal 48 is also routed through series flip-flops 60, 230, which provide alternating inputs to decoder 232. Decoder 232 is a two-to-four line negative true decoder which sequentially outputs a logic low on each of its outputs 270, 272, 274, 276 for the duration of an entire switching cycle C1, C2, C3, C4. Each of decoder outputs 270, 272, 274, 276 is inverted at its corresponding inverting input of AND gates 234, 236, 238, 240. Accordingly, AND gates 234, 236, 238, 240 output a logic high signal when the corresponding decoder output is a logic low and modulated signal 80 is a logic high. The result is a pulse corresponding to modulated signal 80 outputted by a different AND gate 234, 236, 238, 240 for each switching cycle C1, C2, C3, C4 as shown in FIG. 4.

OR gates 242, 244, 248, 250 compare AND gate outputs 234, 236, 238, 240, respectively, with delay signal 102. For example, when AND gate output 234 is a logic high, or delay signal 102 is a logic high, OR gate output 242 is a logic high. As a result of this operation, for each of switching cycles C1, C2, C3, C4, a different enable signal 242, 244, 248, 250 transitions to a logic high before the remaining enable signals transition to a logic high. By commuting enable signals 242, 244, 248, 250 in this matter, switch assemblies 14, 16, 214, 216 are commuted to more evenly distribute the power losses and stresses associated with the switch mode power converter according to the present invention.

Figure 5:
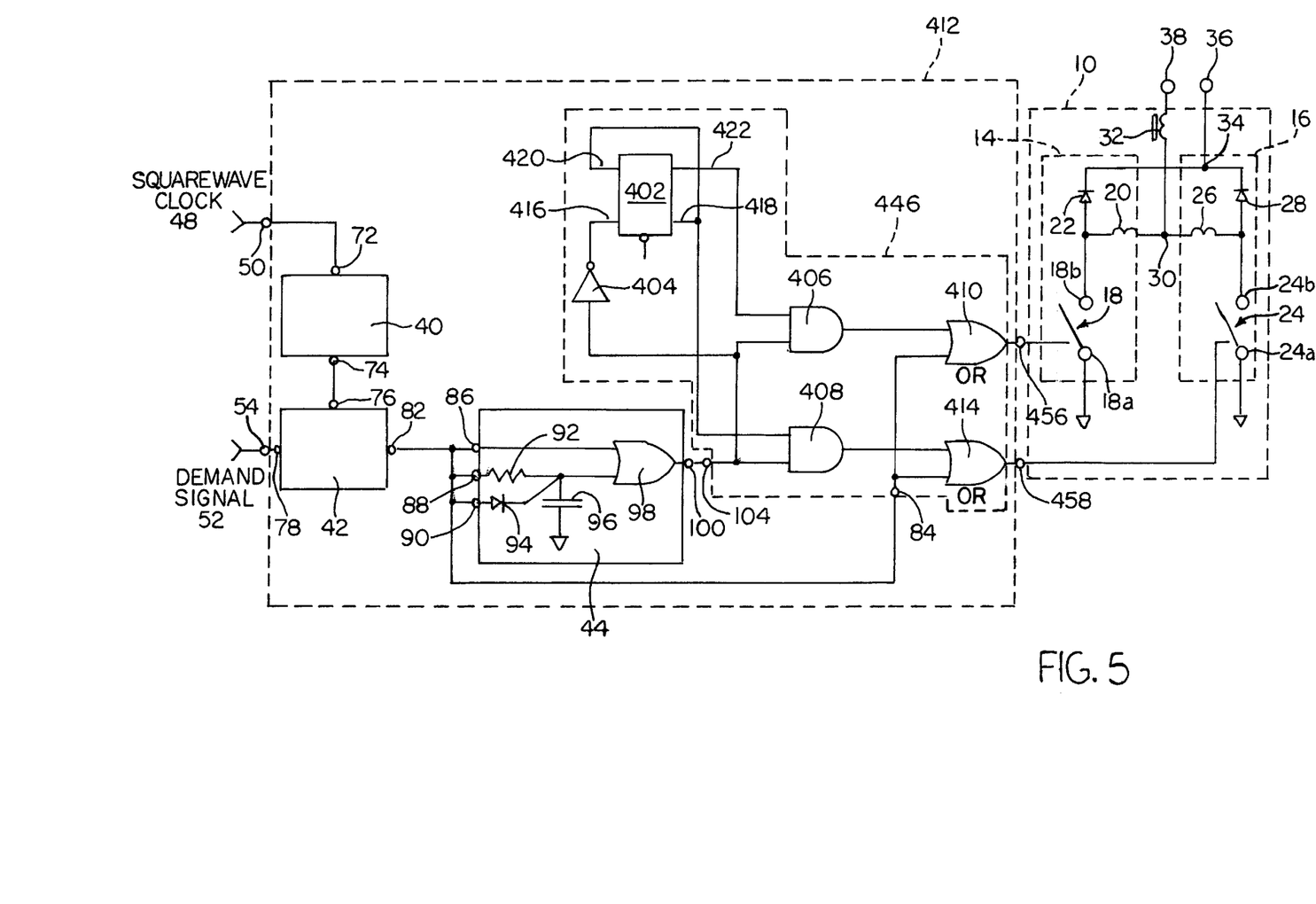
FIG. 5 is a schematic diagram of another embodiment of an apparatus according to the present invention.
Figure 6:
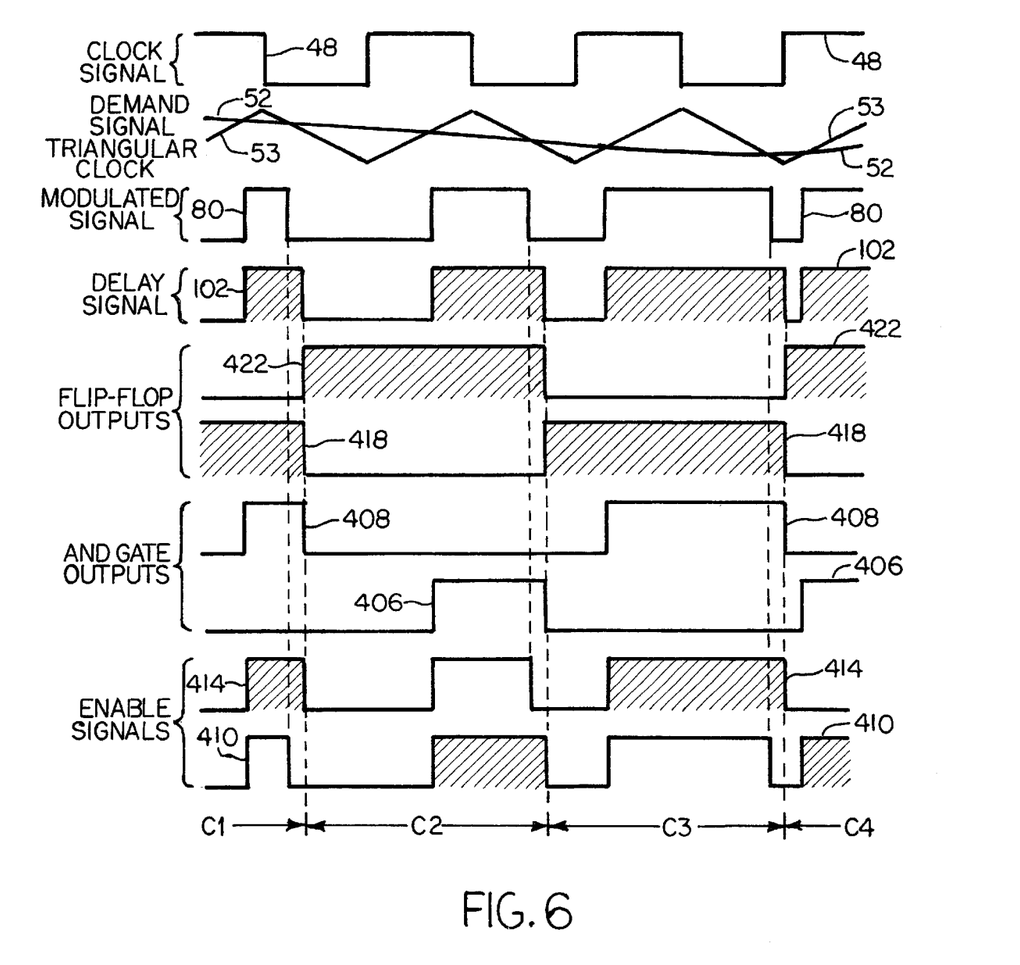
FIG. 6 is a waveform diagram similar to FIG. 2 of the embodiment of FIG. 5.

FIGS. 5 and 6 show another embodiment of the switch commutation concept according to the present invention, applied to reduce turn-off power losses by approaching zero current turn-off ("ZCT") in a switch mode power converter. In this embodiment, one switch assembly, or a subset of switch assemblies, is disabled after the remaining switch assemblies are disabled to reduce turn-off power loss.

Referring now to FIG. 5, two-switch parallel power switching assembly 10 is identical to that shown in FIG. 1. Additionally, triangle generator 40, modulator 42, and delay generator 44 are the same as those shown in FIG. 1, except that diode 94 of delay generator 44 is reversed in direction and gate 98 is an OR gate instead of an AND gate. Switch controller 412 also includes a modified logic circuit 446. Logic circuit 446 includes a flip-flop 402, an inverter 404, AND gates 406, 408, and OR gates 410, 414. Delay generator output 100 is connected to logic circuit input 104, one input of AND gates 406, 408, and the input of inverter 404. Inverter 404 is connected to input 416 of flip-flop 402.

Inverted output 418 of flip-flop 402 is connected to the other input of AND gate 408, and input 420 of flip-flop 402. Output 422 of flip-flop 402 is connected to the other input of AND gate 406.

The outputs of AND gates 406, 408 are connected to an input of OR gates 410, 414, respectively. The other inputs to OR gates 410, 414 are driven by modulated signal 80, which is routed through logic circuit input 84. The outputs of OR gates 410, 414 drive switch assemblies 14, 16 as described above.

In operation, square wave clock signal 48 (FIG. 6) is converted into triangular clock signal 53 by triangle generator 40. Triangular clock signal 53 and demand signal 52 are modulated by modulator 42, resulting in modulated signal 80. Modulated signal 80 is passed through delay circuit 44 to result in delay signal 102. As shown in FIG. 6, the trailing edge of each pulse of delay signal 102 is delayed in time relative to the modulated signal 80. Delay signal 102 is routed through inverter 404 and flip-flop 402 to produce flip-flop outputs 418, 422, each of which transitions from one state to the other at the trailing edge of delay signal 102. The output of AND gate 408 is a logic high whenever both delay signal 102 and flip-flop output 418 are a logic high. Similarly, the output of AND gate 406 is a logic high whenever both delay signal 102 and flip-flop output 422 are a logic high. AND gate outputs 406, 408 are routed to OR gates 410, 414, respectively. The other input to OR gates 410, 414 is provided by modulated signal 80 through logic circuit input 84. Accordingly, the output of OR gate 414 (the enable signal for switch assembly 16) is a logic high whenever either AND gate 408 output is a logic high or modulated signal 80 is a logic high. Similarly, the output of OR gate 410 (the enable signal for switch assembly 14) is a logic high whenever either AND gate output 406 is a logic high or modulated signal 80 is a logic high. The result is that the two enable signals 410, 414 alternate between outputting a pulse corresponding to modulated signal 80 and a pulse corresponding to delay signal 102. Thus, switch assemblies 14, 16 alternate each switching cycle C1, C2, C3, C4 between remaining enabled until after the other switch assembly 14, 16 is disabled and being disabled before the other switch assembly is disabled.

Figure 7:
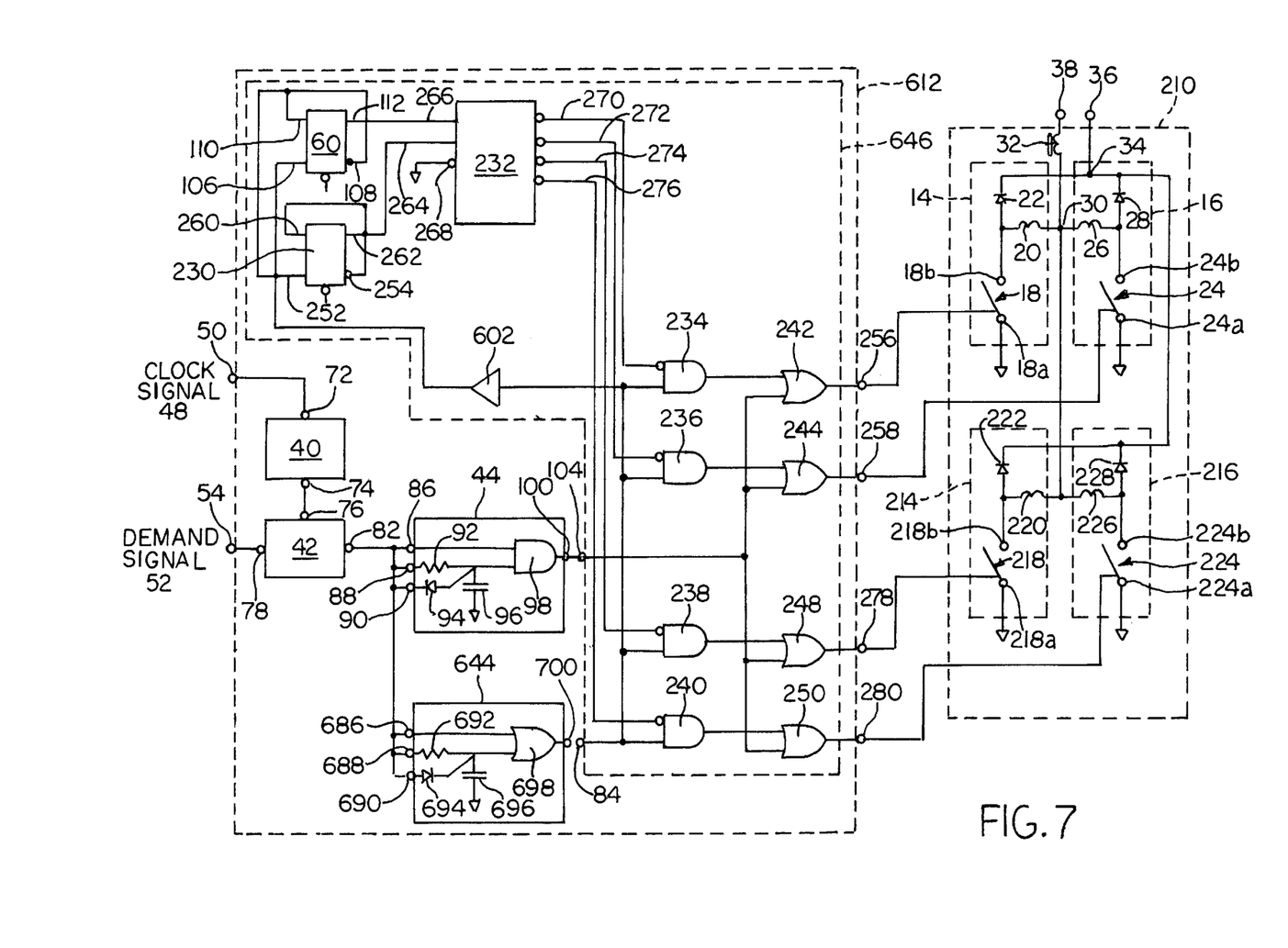
FIG. 7 is a schematic diagram of another embodiment of an apparatus according to the present invention.
Figure 8:
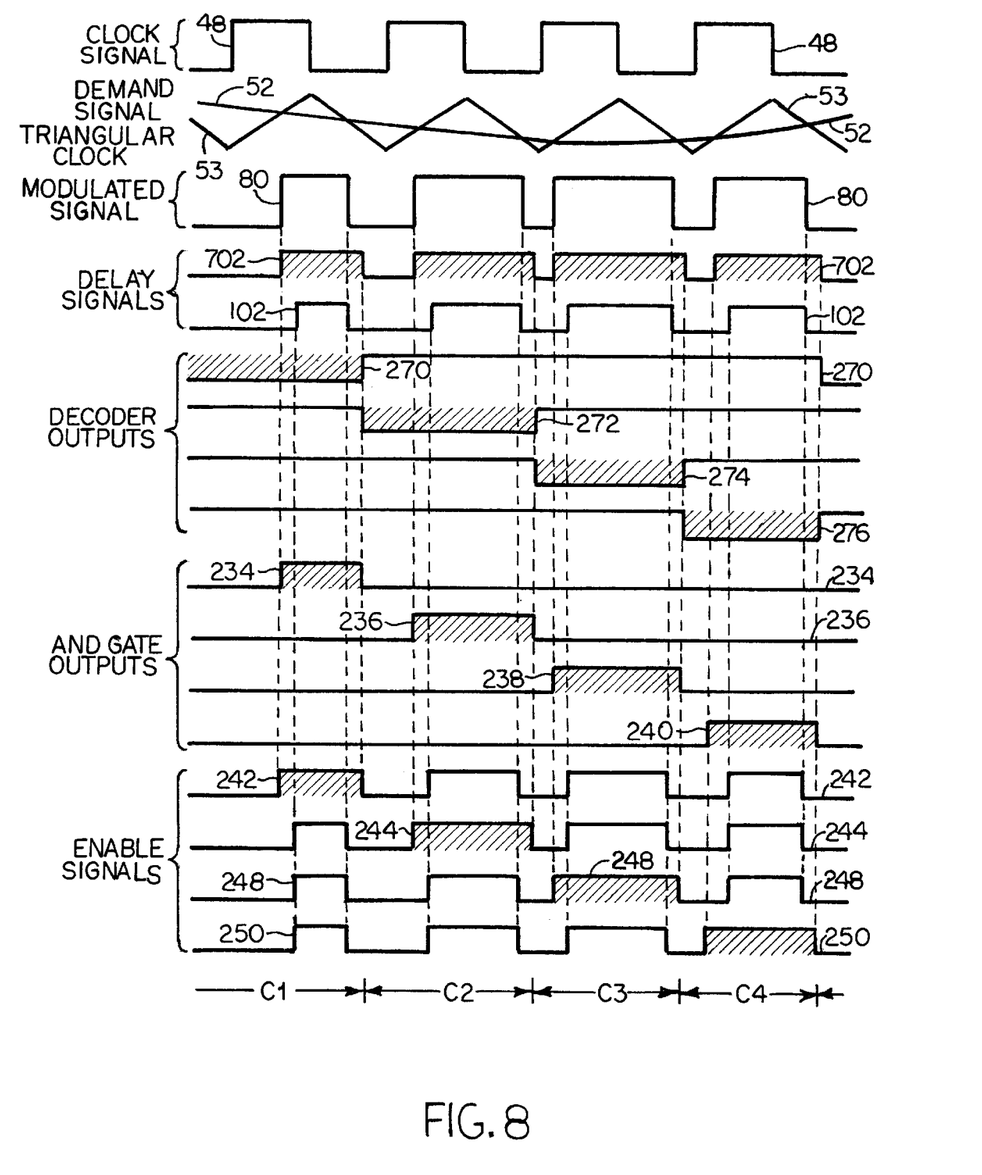
FIG. 8 is a waveform diagram similar to FIG. 2 of the embodiment of FIG. 7.

FIGS. 7 and 8 show yet another embodiment of the present invention including both ZVS and ZCT functions in one power switching assembly 210. Switching assembly 210 is identical to switching assembly 210 described in conjunction with FIG. 3 and retains the same reference designations. Switch controller 612 is similar to switch controller 212 of FIG. 3. Accordingly, like components retain the same reference designations. Like switch controller 212, switch controller 612 includes a triangle generator 40, a modulator 42, and a delay generator 44. The connections between these components are identical to those shown in FIG. 3. Switch controller 612 further includes a second delay circuit 644 which is identical to the first delay circuit 44 except that diode 694 is reversed in direction and gate 698 is an OR gate instead of an AND gate. Output 100 of delay circuit 44 is connected to input 104 of logic circuit 646. Output 700 of delay circuit 644 is connected to input 84 of logic circuit 646.

Logic circuit 646 is identical to logic circuit 246 of FIG. 3 except for the addition of inverter 602 between input 84 and input 106 of flip-flop 60. It should be noted that input 84 in FIG. 7 is connected to second delay circuit 644 as opposed to modulator 42, as was the case with FIG. 3. Additionally, it should be noted that instead of supplying clock signal 48 to flip-flop 60, the output of second delay circuit 644 is inverted through inverter 602 and provided to flip-flop 60.

As best shown in FIG. 8, clock signal 48 is converted to triangular clock signal 53. Triangular clock signal 53 is compared to demand signal 52 to create modulated signal 80 at output 82 of modulator 42. Modulated signal 80 is then passed through delay circuit 44, which outputs delay signal 102. As shown in FIG. 8, the leading edge of each pulse of delay signal 102 is delayed in time relative to the leading edge of a corresponding pulse of modulated signal 80. Modulated signal 80 is also passed through delay circuit 644, which outputs delay signal 702. The trailing edge of each pulse of delay signal 702 is delayed in time relative to the trailing edge of a corresponding pulse of modulated signal 80. Delay signal 702 is then routed through inverter 602, flip-flops 60, 230, and decoder 232 which provides decoder outputs 270, 272, 274, 276 to the inverting inputs of AND gates 234, 236, 238, 240, respectively. Delay signal 702 is also routed to the non-inverting inputs of AND gates 234, 236, 238, 240. Accordingly, as shown in FIG. 8, when delay signal 702 is a logic high and any one of the decoder outputs 270, 272, 274, 276 is a logic low, the corresponding AND gate output 234, 236, 238, 240 is a logic high.

AND gates outputs 234, 236, 238, 240 are routed to one input of OR gates 242, 244, 248, 250 which also receive as a second input delay signal 102. Accordingly, the output of OR gate 242, for example, is a logic high when either AND gate output 234 is a logic high or delay signal 102 is a logic high. As such, one of the enable signals 242, 244, 248, 250 begins before and ends after the remaining enable signals during each switching cycle C1, C2, C3, C4. Accordingly, a different switch assembly 14, 16, 214, 216 (or subset of switch assemblies) is enabled first to reduce turn-on power loss and disabled last to reduce turn-off power loss. The commuting of selected switch assemblies 14, 16, 214, 216 more evenly distributes the heat and stress of acting as an auxiliary switch.

Figure 9:
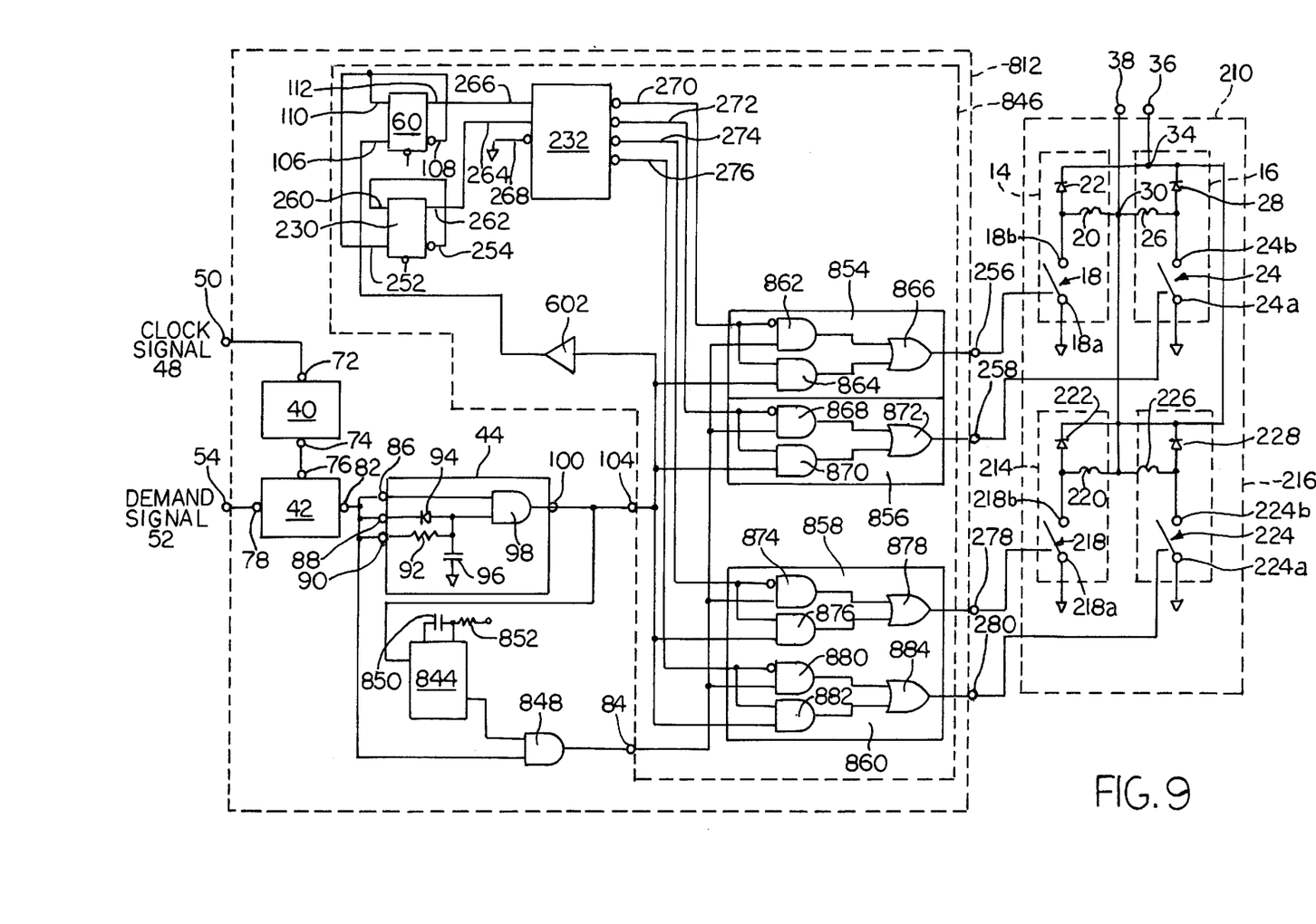
FIG. 9 is a schematic diagram of another embodiment of an apparatus according to the present invention.
Figure 10:
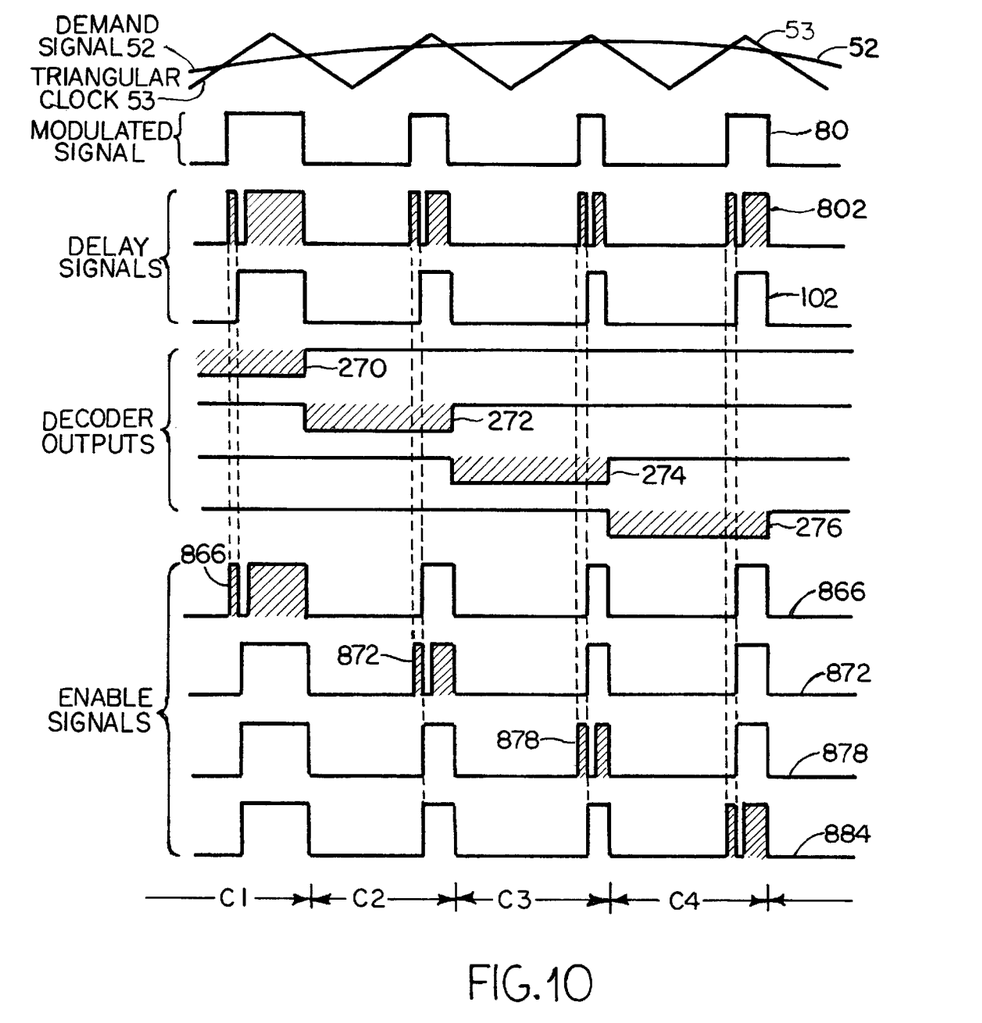
FIG. 10 is a waveform diagram similar to FIG. 2 of the embodiment of FIG. 9.

FIGS. 9 and 10 show another embodiment of the invention wherein the energy in the inductance of the circuit functioning as an auxiliary switch is recovered. Generally, by modifying the switching cycle of the switch functioning as the auxiliary switch, the energy in the interconnecting inductances can be returned to the main circuit. When this energy is returned, it is prevented from circulating and being dissipated in the switch assembly during its conduction phase. Whenever the L/R time constant of the parallel power switching assembly is less than or approximately equal to the enable time of the switch functioning as the auxiliary switch, as should commonly be the case, increased efficiency may be achieved through use of the embodiment described below. After the switch functioning as the auxiliary switch discharges its inductance, the parallel power switching assembly will naturally return the switch to a low (zero) voltage. After this occurs, the switch may be turned on to aid the other switching assemblies in the conduction cycle.

Referring now to FIG. 9, parallel power switch assembly 210 is identical to switching assembly 210 of FIGS. 3 and 7, and retains the same reference designations. Switch controller 812 is similar to switch controller 212 of FIGS. 3 and 7. Thus, like components retain the same reference designations. Switch controller 812, like switch controller 212, includes a triangle generator 40, a modulator 42, and a delay generator 44. The connections between these components are identical to those shown in FIGS. 3 and 7. Switch controller 812 further includes a one-shot 844 having an input connected to output 100 of delay generator 44 and an output connected to one input of AND gate 848. The other input of AND gate 848 is connected to output 82 of modulator 42. The output of AND gate 848 is connected to input 84 of logic circuit 846. The cycle time for one-shot 844 (also the regeneration time for the switching assembly 14, 16, 214, 216 acting as the auxiliary switch) is set by the RC time constant of capacitor 850 and resistor 852.

Logic circuit 846 is similar to logic circuit 646 of FIG. 7 except that AND gates 234, 236, 238, 240 and OR gates 242, 244, 248, 250 are replaced by four, 2-to-1 multiplexers 854, 856, 858, 860. Multiplexer 854 includes first and second AND gates 862, 864, respectively, and OR gate 866. The inverting input of first AND gate 862 is connected to decoder output 270, which is also connected to one input of second AND gate 864. The other input of first AND gate 862 is connected to input 84 of logic circuit 846 and receives delay signal 802 (FIG. 10) from AND gate 848.

The other input of second AND gate 864 is connected to input 104 of logic circuit 846 and receives delay signal 102 (FIG. 10) from delay circuit 44. The outputs of first and second AND gates 862, 864 are connected to the inputs of OR gate 866. The output of OR gate 866 is connected to logic circuit output 256 and controls switching assembly 14.

The connections of multiplexers 856, 858, and 860 are similar to those described above, except that multiplexers 856, 858, and 860 are connected to decoder outputs 272, 274, and 276, respectively, and control switching assemblies 16, 214, and 216, respectively. Multiplexers 854, 856, 858, 860 route either delay signal 102 or delay signal 802 to switching assemblies 14, 16, 214, 216, respectively. Only one of switching assemblies 14, 16, 214, 216, selected by decoder 232, receives delay signal 802 during each switching cycle. As was the case with the earlier-described embodiments of the present invention, flip-flops 60, 230 are triggered by the falling edge of delay signal 102 (after inversion by inverter 602), thereby preventing reconfiguration during the conduction cycle of switching assemblies 14, 16, 214, 216. If modulator 42 saturates (i.e., demand signal 52 is greater than triangular clock 53), commutation of switching assemblies 14, 16, 214, 216 stops.

One-shot 844 is triggered by the rising edge of delay signal 102 which coincides with the ZVS turn-on of three of the four switching assemblies 14, 16, 214, 216. This is the optimum time to begin energy recovery because the energy in the inductance of the switching assembly 14, 16, 214, 216 acting as the auxiliary switch has not yet begun to dissipate in the switching assembly. The time constant of resistor 852 and capacitor 850 is set long enough to permit recovery of all of the inductor energy, and to permit switching assemblies 14, 16, 214, 216 to reach a ZVS condition. This time is proportional to the current requirements of parallel power switch assembly 210. One of ordinary skill in the art could readily modulate this time as a function of the measured current of parallel power switch assembly 210, but the energy gain would be small relative to the energy recovered during the regeneration cycle. As should be apparent from the foregoing, one of ordinary skill in the art could also readily modify the circuit of FIG. 9 to sense the onset of the ZVS condition and enable the switching assembly 14, 16, 214, 216 acting as the auxiliary switch based on the occurrence of the ZVS condition.

Referring now to FIG. 10, modulated signal 80 from modulator 42 is a logic high when triangular clock 53 from triangle generator 40 is greater than demand signal 52. Modulated signal 80 is routed to one input of AND gate 848 (the other input of which is initially a logic high from the inverted output of one-shot 844) and to delay generator 44 (the output of which is initially a logic low). Since both inputs to AND gate 848 are logic high signals, the output (delay signal 802) is a logic high. After a delay time, determined by resistor 92 and capacitor 96, delay generator 44 transitions to a logic high. This triggers one-shot 844 to output a logic low, causing delay signal 802 to go low. Delay signal 802 remains a logic low for the duration of the RC time constant of resistor 852 and capacitor 850. After this time constant, one-shot 844 outputs a logic high, and delay signal 802 goes high. When modulated signal 80 transitions to a logic low, delay signal 102 from delay generator 44 goes low and delay signal 802 goes low because the modulated signal 80 input to AND gate 848 is low.

As shown in FIG. 10, decoder 232 sequentially enables multiplexers 854, 856, 858, and 860 with decoder output signals 270, 272, 274, and 276, respectively. When multiplexer 854 is enabled with decoder output 270 during switching cycle C1, the logical arrangement of AND gates 862, 864 and OR gate 866, for example, produce an output at OR gate 866 essentially identical to delay signal 802. The remaining multiplexer outputs at OR gates 872, 878, 884 correspond to delay signal 102. By sequentially enabling multiplexers 854, 856, 858, 860, decoder 232 commutes the switching assembly 14, 16, 214, 216 that functions as the auxiliary switch as described above in the descriptions of other embodiments of the invention.

Although the present invention has been shown and described in detail, the same is to be taken by way of example only and not by way of limitation. Numerous changes can be made to the embodiments described above without departing from the scope of the invention.

What is claimed is:

1. A switch mode power converter, including:
    a first switch having one node connected to a first inductor;
    a second switch connected in parallel to said first switch, said second switch having one node connected to a second inductor, the first and second inductors being connected to a common node;
    a controller coupled to the first and second switches to enable each of the switches during each of a plurality of switching cycles, the first and second switches conducting simultaneously for at least a substantial portion of each switching cycle, the controller enabling the first switch before enabling the second switch during one quantity of the cycles so that a voltage across the second switch reaches approximately zero before the second switch is enabled, and enabling the second switch before enabling the first switch during the remaining cycles so that a voltage across the first switch reaches approximately zero before the first switch is enabled.

2. The converter of claim 1 wherein the controller disables both of the switches substantially simultaneously during each of the plurality of switching cycles.

3. The converter of claim 1 wherein the controller enables the first switch before enabling the second switch every other switching cycle.

4. The converter of claim 1 wherein the controller outputs an enable pulse to each switch during each cycle, each switch being enabled and disabled by its respective pulse.

5. The converter of claim 4 wherein each switch is enabled by the leading edge of its respective pulse and disabled by the trailing edge of its respective pulse.

6. The converter of claim 4 wherein the controller includes a modulator having a first input coupled to a clock signal, a second input coupled to a demand signal, and an output, the modulator outputting a modulated signal derived from the signal and the demand signal, the enable pulses being derived from the modulated signal.

7. The converter of claim 6 wherein the controller includes a delay generator for receiving the modulated signal, the modulated signal including a plurality of pulses, each having a leading edge and a trailing edge, the delay generator outputting a delay signal including a plurality of pulses corresponding to the modulated signal pulses, each delay signal pulse having a leading edge occurring after the leading edge of the corresponding modulated signal pulse and a trailing edge occurring substantially simultaneously with the trailing edge of the corresponding modulated signal pulse.

8. The converter of claim 7 wherein the controller includes a logic circuit having inputs for receiving the clock signal and the delay signal, the logic circuit deriving the enable pulses from the clock signal and the delay signal.

9. The converter of claim 1 wherein the controller disables the first switch after disabling the second switch during the one quantity of switching cycles so that a current through the second switch reaches approximately zero before the first switch is disabled, and disables the second switch after disabling the first switch during the remaining quantity of cycles so that a current through the first switch reaches approximately zero before the second switch is disabled.

10. The converter of claim 1 wherein the controller disables the first switch for a period of time to recover energy in an inductance of the first switch at substantially the same time as the controller enables the second switch.

11. The converter of claim 10 wherein the controller includes a one-shot, the period of time being equal to the time constant of the one-shot.

12. The converter of claim 10 wherein the controller again enables the first switch after the period of time, and disables both the first and the second switches at substantially the same time.

13. The converter of claim 1 further including a first diode connected between the one node of the first switch and another common node, and a second diode connected between the one node of the second switch and the other common node.

14. The converter of claim 13 wherein the first switch acts to recover forward conduction current stored in the second diode during the one quantity of switching cycles and the second switch acts to recover forward conduction current stored in the first diode during the remaining quantity of cycles.

15. A switch mode power converter, including:
a plurality of switches, each switch connected in parallel through a separate inductor to a common node;
a controller having a plurality of outputs, each output coupled to a separate switch, the controller outputting enable pulses to the plurality of switches on the plurality of outputs to activate and deactivate the plurality of switches during each of a plurality of switching cycles according to a sequence to reduce power losses of the converter due to switching, the sequence including activating a first subset of switches before activating the remaining switches and deactivating a second subset of switches after deactivating the remaining switches, the first and second subsets of switches conducting simultaneously for at least a substantial portion of each switching cycle.

16. The converter of claim 15 wherein the switches included in the first subset of switches are the same as the switches included in the second subset of switches.

17. The converter of claim 15 wherein during each switching cycle, the first subset of switches includes only one switch of the plurality of switches, the one of each cycle being different from the one switch of the immediately preceding cycle.

18. The converter of claim 15 wherein the first subset of switches is commuted each successive switching cycle.

19. The converter of claim 15 wherein each switch is activated by a leading edge of each enable pulse provided at the controller output corresponding to the switch and is deactivated by a trailing edge of each enable pulse provided at the controller output corresponding to the switch.

20. The converter of claim 15 wherein the controller includes a modulator having an input for receiving a demand signal and an output for outputting a modulated signal including modulator pulses, the controller being configured to generate the enable pulses from the modulator pulses.

21. The converter of claim 20 wherein the controller includes a first delay generator coupled to the modulator for converting the modulator pulses into first delay pulses, each first delay pulse having a leading edge which occurs in time after a leading edge of the corresponding modulator pulse and a trailing edge which occurs at substantially the same time as a trailing edge of the corresponding modulator pulse, the controller deriving the enable pulses used to activate the remaining switches from the first delay pulses.

22. The converter of claim 21 wherein the controller includes a second delay generator coupled to the modulator for converting the modulator pulses into second delay pulses, each second delay pulse having a trailing edge which occurs in time after the trailing edge of the corresponding modulator pulse and a leading edge which occurs at substantially the same time as the leading edge of the corresponding modulator pulse, the controller deriving the enable pulses used to activate the second subset of switches from the second delay pulses.

23. The converter of claim 15 further including a plurality of diodes, each diode being connected between a different one of the plurality of switches and another common node.

24. The converter of claim 23 wherein the first subset of switches recover forward conduction current stored in the diodes connected to the remaining switches when the first subset of switches is activated.

25. A switch mode power converter, including:
a plurality of switch assemblies connected in parallel, each switch assembly being connected to a common node through an inductor associated with the switch assembly; and
a controller for activating and deactivating the plurality of switch assemblies during successive switching cycles to reduce power loss of the converter due to switching, the controller activating and deactivating each switch assembly one time during each switching cycle, and activating one of the switch assemblies before activating the remaining switch assemblies during a first switching cycle, the plurality of switch assemblies conducting simultaneously for at least a substantial portion of each switching cycle.

26. The converter of claim 25 wherein the controller activates a different one of the switch assemblies before activating the remaining switch assemblies during a second switching cycle.

27. The converter of claim 25 wherein the controller simultaneously deactivates all of the plurality of switch assemblies during each switching cycle.

28. The converter of claim 25 wherein the controller deactivates the one switch assembly after deactivating the remaining switch assemblies during the first switching cycle.

29. The converter of claim 28 wherein the controller deactivates a different one of the switch assemblies after deactivating the remaining switch assemblies during a second switching cycle.

30. The converter of claim 25 wherein the controller deactivates the one switch assembly for a period of time to recover energy in an inductance of the one switch assembly at substantially the same time as the controller activates the remaining switch assemblies.

31. The converter of claim 30 wherein the controller includes a one-shot, the period of time being equal to the time constant of the one-shot.

32. The converter of claim 30 wherein the controller again activates the one switch assembly after the period of time, and deactivates the plurality of switch assemblies at substantially the same time.

* * * * *

UNITED STATES PATENT AND TRADEMARK OFFICE
CERTIFICATE OF CORRECTION

PATENT NO.   : 6,426,883 B1
DATED        : July 30, 2002
INVENTOR(S)  : Gerald R. Stanley It is certified that error appears in the above-identified patent and that said Letters Patent is hereby corrected as shown below:

Column 11,
Line 2, please insert the word -- clock -- after the word "the" and before the word "signal."

Column 12,
Line 3, please insert the word -- switch -- after the word "one" and before the word "of."

Signed and Sealed this

Fifteenth Day of October, 2002

*Attest:*

*Attesting Officer*

JAMES E. ROGAN
*Director of the United States Patent and Trademark Office*